US008886730B2

(12) United States Patent
Kowalewski

(10) Patent No.: US 8,886,730 B2
(45) Date of Patent: Nov. 11, 2014

(54) METHODS AND DEVICES FOR AUTHORIZATION IN COLLABORATIVE COMMUNICATIONS SESSIONS

(75) Inventor: Frank Kowalewski, Goettingen (DE)

(73) Assignee: Intel Mobile Communications GmbH, Neubiberg (DE)

(*) Notice: Subject to any disclaimer, the term of this patent is extended or adjusted under 35 U.S.C. 154(b) by 283 days.

(21) Appl. No.: 12/887,616

(22) Filed: Sep. 22, 2010

(65) Prior Publication Data
US 2012/0072503 A1 Mar. 22, 2012

(51) Int. Cl.
*G06F 15/16* (2006.01)
*H04L 29/06* (2006.01)

(52) U.S. Cl.
CPC ........ *H04L 65/1016* (2013.01); *H04L 65/1083* (2013.01); *H04L 65/403* (2013.01)
USPC ............ 709/206; 709/205; 709/221; 709/229

(58) Field of Classification Search
USPC ......... 709/206, 204, 205, 207, 221, 227–229; 370/260–269
See application file for complete search history.

(56) References Cited

U.S. PATENT DOCUMENTS

| 7,860,501 | B2* | 12/2010 | Wu ............................ 455/435.1 |
| 2007/0174400 | A1* | 7/2007 | Cai et al. ...................... 709/206 |
| 2007/0263615 | A1* | 11/2007 | Zhu et al. ...................... 370/356 |
| 2010/0199320 | A1* | 8/2010 | Ramanathan et al. ........ 725/109 |
| 2010/0312834 | A1* | 12/2010 | Doken et al. .................. 709/205 |
| 2011/0053571 | A1* | 3/2011 | Mahdi et al. ................ 455/414.1 |
| 2011/0110275 | A1* | 5/2011 | Shaheen ........................ 370/260 |
| 2011/0161508 | A1* | 6/2011 | Kim et al. ...................... 709/228 |
| 2011/0289148 | A1 | 11/2011 | Kowalewski |
| 2011/0292841 | A1* | 12/2011 | Sedlacek et al. .............. 370/260 |

FOREIGN PATENT DOCUMENTS

| CN | 1645812 A | 7/2005 |
| CN | 101207612 A | 6/2008 |
| CN | 100502359 C | 6/2009 |
| DE | 102010017925 A1 | 10/2011 |
| WO | 2004/073241 A2 | 8/2004 |
| WO | 2010/015208 A1 | 2/2010 |

OTHER PUBLICATIONS

3GPP Technical Specification TS23.237, V9.2.0, 3rd Generation Partnership Project, Technical Specification Group Services and Architecture, IP Multimedia Subsystem (IMS) Service Continuity, Stage 2, (Release 9), Sep. 2009; pp. 1-88.
Rosenberg et al., IETF Request for Comments RFC3261: "SIP: Session Initiation Protocol", Network Working Group, Jun. 2002, pp. 1-270.

(Continued)

*Primary Examiner* — Ruolei Zong
(74) *Attorney, Agent, or Firm* — Schwabe, Williamson & Wyatt, P.C.

(57) ABSTRACT

In an embodiment, a method for changing a collaborative communications session may be provided. The method may include: sending a request message requesting for authorizing a change of a collaborative communications session to an end device of the collaborative communications session; determining whether an authorization message is received from the end device in response to the request message sent; and changing the collaborative communications session, in case it is determined that an authorization message is received from the end device in response to the request message sent.

8 Claims, 5 Drawing Sheets

(56) References Cited

OTHER PUBLICATIONS

R. Sparks, IETF Request for Comments RFC3515: "The Session Initiation Protocol (SIP) Refer Method", Network Working Group, Apr. 2003, pp. 1-19.

3GPP Technical Specification TS24.237, V9.1.0, 3rd Generation Partnership Project, Technical Specification Group Core Network and Terminals, IP Multimedia (IM) Core Network (CN) subsystem IP Multimedia Subsystem (IMS) Service Continuity, Stage 3, (Release 9), Dec. 2009, pp. 1-176.

Handley et al., IETF Request for Comments RFC2327: "SDP: Session Description Protocol", Network Working Group, Apr. 1998, pp. 1-35.

3GPP Technical Specification TS22.228, V10.2.0, 3rd Generation Partnership Project; Technical Specification Group Services and System Aspects; Service requirements for the Internet Protocol (IP) multimedia core network subsystem; Stage 1 (Release 10), Dec. 2009; pp. 1-35.

3GPP Technical Specification TR23.831, V1.0.0, 3rd Generation Partnership Project; Technical Specification Group Services and System Aspects; IP Multimedia Subsystem (IMS) Service Continuity; Inter-UE Transfer enhancements; Stage 2 (Release 10), Jun. 2010; pp. 1-79.

S. Donovan, IETF Request for Comments RFC2976: "The SIP INFO Method", Network Working Group, Oct. 2000, pp. 1-10.

Holmberg et al., IETF Draft, Session Initiation Protocol (SIP) INFO Method and Package Framework, draft-ietf-sipcore-info-events-07, http://tools.ietf.org/html/draft-ietf-sipcore-info-events-07.html, Feb. 2010, pp. 1-39.

English Abstract of DE 102010017925 A1 published on Oct. 27, 2012.

Office action received for German Patent Application No. 102011053849.6, mailed on Oct. 31, 2013, 6 pages of Office action and 2 pages of English Translation.

Office action received for Chinese Patent Application No. 201110283338.9, mailed on Sep. 30, 2013, 14 pages of Office action and 21 pages of English Translation.

3GPP; 3rd Generation partnership Project; Technical Specification Group Core Network and Terminals; IP Multimedia (IM) Core Network (CN) subsystem inter-UE transfer enhancements; Stage 3, Aug. 2010; 3GPP TR24.837 V0.3.0 release 10.

3GPP; 3rd Generation partnership Project; Technical Specification Group Services and System Aspects; IP Multimedia subsystem (IMS) Service Continuity; Inter-UE, Feb. 10, 2010; 3GPP TR23.831 V0.2.0.

Arabshian et al. "A SIP-based Medical Event Monitoring System" Proceddings of the first Annual International Conference on Mobile and Ubiquitous Systems: Networking and Services, IEEE, dated Dec. 31, 2004, 5 pages.

Second Office Action received for Chinese Patent Application No. 102413120, mailed Feb. 28, 2014, 31 pages, inclusive of English translation.

Office Action received for German Patent Application No. 102011053849.6, mailed May 5, 2014, 13 pages, inclusive of English translation.

\* cited by examiner

Change a collaborative communication session, in case it is determined that an authorization message is received from an end device in response to a sent request message requesting authorization of a change of a collaborative communication session

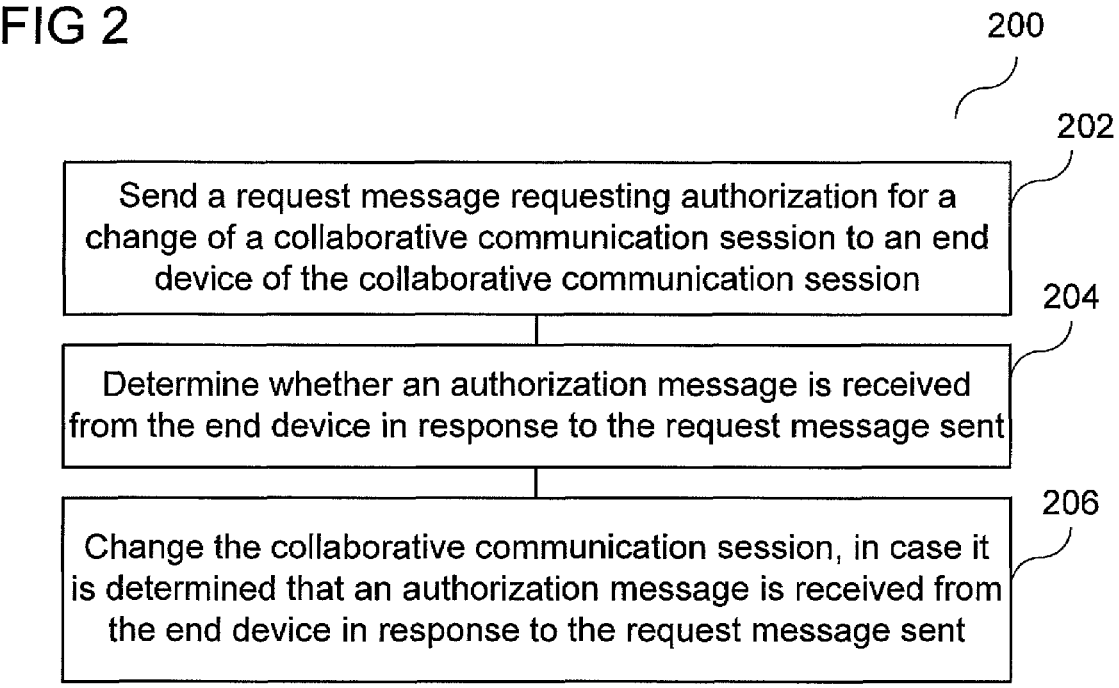
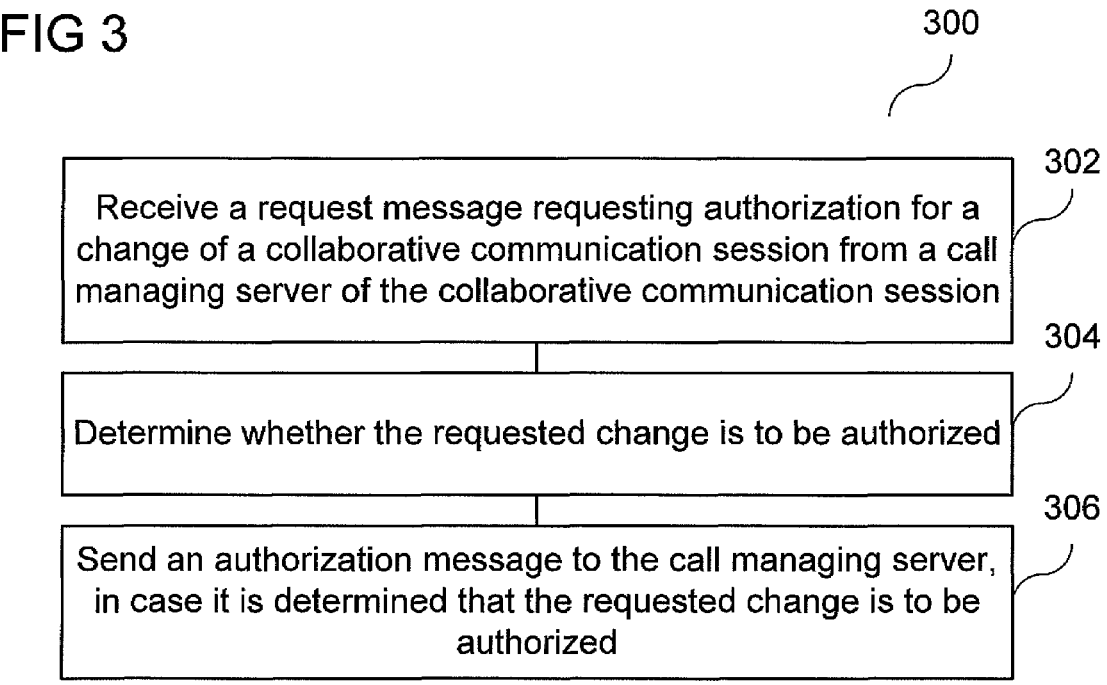

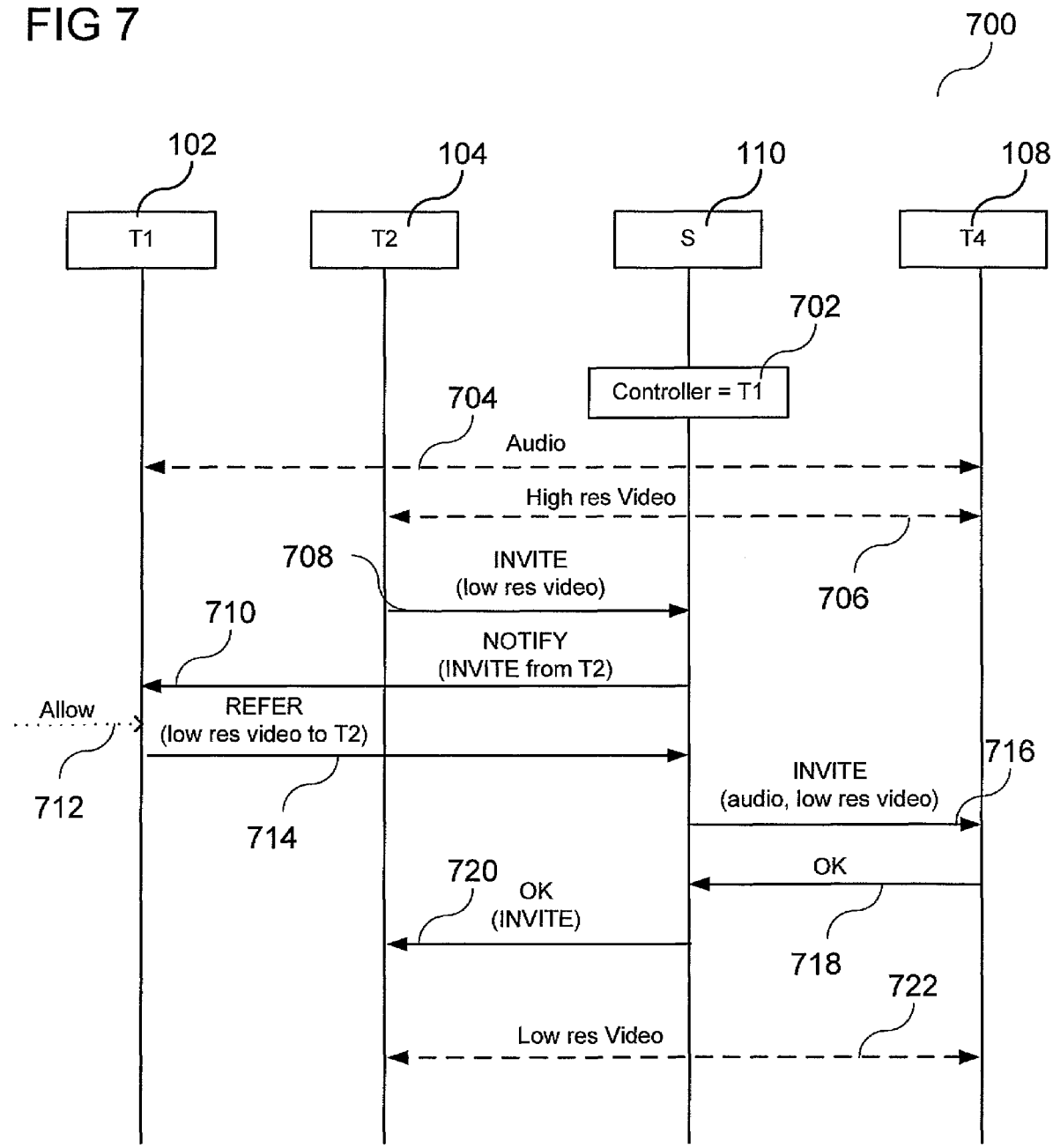

METHODS AND DEVICES FOR AUTHORIZATION IN COLLABORATIVE COMMUNICATIONS SESSIONS

TECHNICAL FIELD

Embodiments relate generally to methods for changing a collaborative communications session, methods for authorizing a change of a collaborative communications session, call managing servers, and end devices for authorizing a change of a collaborative communications session.

BACKGROUND

Collaborative communications sessions may be held in various kinds of networks. A collaborative session may be a peer's communications session that may include multiple communication devices. In other words the communication peer may be using multiple communication devices to communicate with other peers. One or several of the devices may be controlling the collaborative session. Those controller devices may be able to direct media (e.g. audio, video, text, etc.) to the collaborative session's devices.

According to commonly used methods, in IMS collaborative sessions it may be disadvantageous that media modifications requested by controlled devices may not be authorized by a controller device that belongs to a different subscriber.

According to commonly used methods, in IMS collaborative sessions with multiple controller devices, it may be disadvantageous that actions by one controller device may not be authorized by the other controller devices of the collaborative session. This may especially be disadvantageous if the controller devices belong to different subscribers.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2 shows a flow diagram illustrating a method for changing a collaborative communications session in accordance with an embodiment;

FIG. 3 shows a flow diagram illustrating a method for authorizing a change of a collaborative communications session;

FIG. 7 shows a signaling flow diagram illustrating a signaling flow in accordance with an embodiment.

DESCRIPTION

Figure 1:
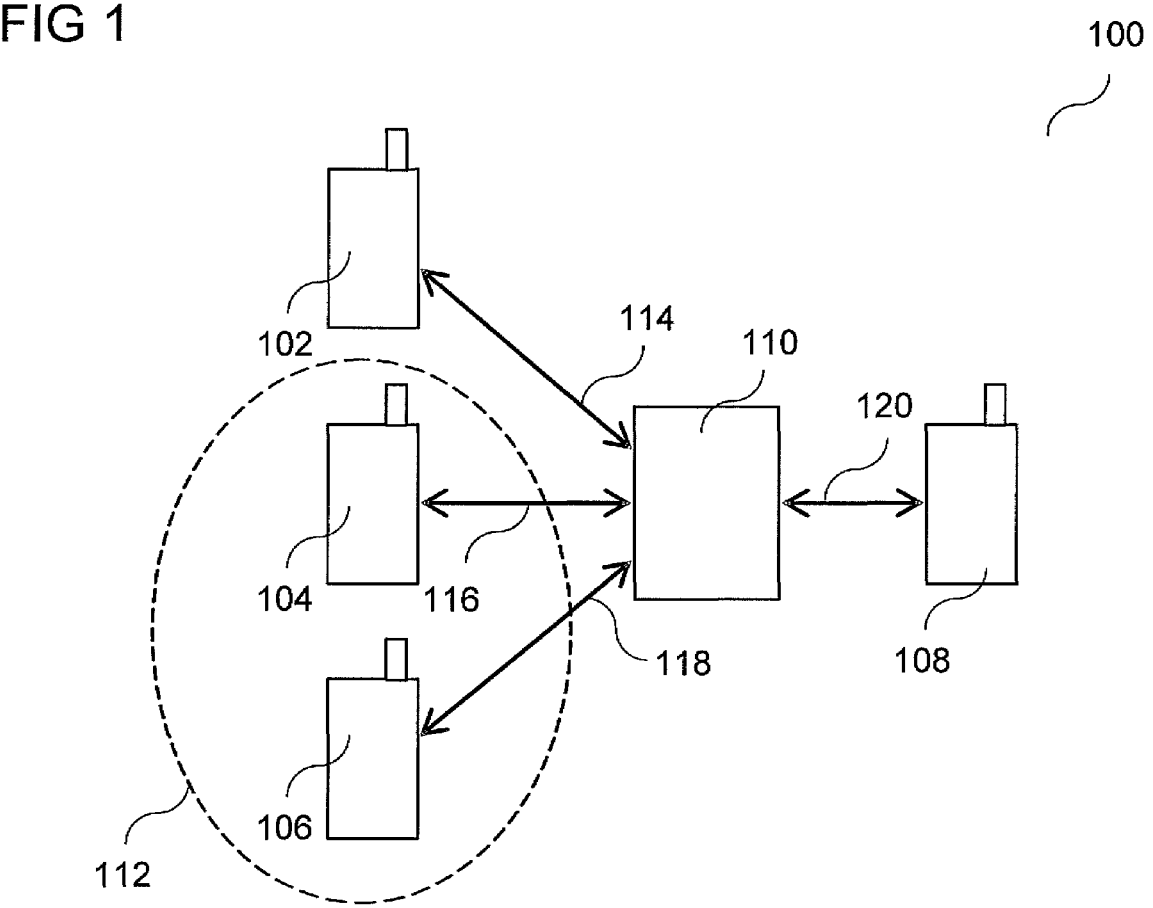
FIG. 1 shows various communication devices in accordance with an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any embodiment or design described herein as "exemplary" is not necessarily to be construed as preferred or advantageous over other embodiments or designs.

An end user device according to various embodiments may be a device configured for wired communication, for example a desktop computer or laptop, or for wireless communication, for example a radio communication device. In various embodiments, a radio communication device may be an end-user mobile device (MD). In various embodiments, a radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

The end user device may include a memory which may for example be used in the processing carried out by the end user device. The call managing server may include a memory which is for example used in the processing carried out by the call managing server. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments are provided for devices, and various embodiments are provided for methods. It will be understood that basic properties of the devices also hold for the methods and vice versa. Therefore, for sake of brevity, duplicate description of such properties may be omitted.

FIG. 1 shows various communication devices in accordance with an embodiment. In the arrangement 100, a first end device 102 (which may also be referred to as T1), a second end device 104 (which may also be referred to as T2), a third end device 106 (which may also be referred to as T3), a fourth end device 108 (which may also be referred to as T4), and a call managing server 110 (which may also be referred to as S) may be provided. Each of the end devices may belong to a user, and a user may have more than one end device. For example, the first end device 102 may belong to a first user (who may also be referred to as U1). The second end device 104 and the third end device 106 may belong to a second user (who may also be referred to as U2), like indicated by dashed ellipse 112. The fourth end device 108 may belong to a third user (who may also be referred to as U3). The first end device 102 may communicate with the call managing server 110, for example via a wired connection or a wireless connection, like indicated by a first arrow 114. The second end device 104 may communicate with the call managing server 110, for example via a wired connection or a wireless connection, like indicated by a second arrow 116. The third end device 106 may communicate with the call managing server 110, for example via a wired connection or a wireless connection, like indicated by a third arrow 118. The fourth end device 108 may communicate with the call managing server 110, for example via a wired connection or a wireless connection, like indicated by a fourth arrow 120.

For example, the arrangement 100 may illustrate a simplified architecture of an IMS (IP (Internet Protocol) Multimedia Subsystem) based communications system, wherein the call managing server 110 may be a IMS server, like will be explained in more detail below.

FIG. 2 shows a flow diagram 200 illustrating a method for changing a collaborative communications session in accordance with an embodiment. In 202, a request message requesting for authorizing a change of a collaborative communications session may be sent to an end device of the collaborative communications session. In 204, it may be determined whether an authorization message is received from the end device in response to the request message sent. In 206, the collaborative communications session may be changed in case it is determined that an authorization message is received from the end device in response to the request message sent.

According to various embodiments, the sending, determining and changing may be performed by a call managing server.

According to various embodiments, at least one of the request message and the authorization message may be a message in accordance with a call control protocol. The call control protocol may also be referred to as a session control protocol or as a telecommunication conference control protocol.

According to various embodiments, the call control protocol may include or may be at least one of: Session Initiation Protocol SIP, Real-Time Control Protocol RTCP, Hyper Text Transport Protocol http, File Transfer Protocol FTP, Simple Mail Transfer Protocol SMTP, and XML Configuration Access Protocol XCAP.

According to various embodiments, the change of the collaborative communications session may be related to at least one of the following types of change: change of an existing media of the collaborative communications session; addition of a media to the collaborative communications session; and release of a media from the collaborative communications session.

According to various embodiments, the request message may be a SIP NOTIFY message or a SIP INFO message.

According to various embodiments, the authorization message may be a SIP REFER message or a SIP INFO message.

According to various embodiments, it may be determined that no authorization message is received from the end device in response to the request message sent in case no authorization message is received from the end device within a predetermined period of time after the time of sending the request message.

According to various embodiments, it may be determined that no authorization message is received from the end device in response to the request message sent in case a non-authorization message is received from the end device in response to the request message sent.

According to various embodiments, in case it is determined that no authorization message is received from the end device in response to the request message sent, the collaborative communications session may not be changed.

According to various embodiments, in the request message, a type of a change for which authorization is requested, may be indicated.

According to various embodiments, in case an authorization message is received from the end device in response to the request message sent, the collaborative communications session may be changed in accordance with the type of change for which authorization is requested.

According to various embodiments, sending the request message requesting for the authorization of the change of the collaborative communications session to the end device of the collaborative communications session may be performed based on a subscription of the end device for notifications about collaborative communications session change requests.

According to various embodiments, sending the request message requesting for the authorization of the change of the collaborative communications session to the end device of the collaborative communications session may be performed based on a subscription of the end device for a dialog event package.

FIG. 3 shows a flow diagram 300 illustrating a method for authorizing a change of a collaborative communications session. In 302, a request message requesting for authorizing a change of a collaborative communications session may be received from a call managing server of the collaborative communications session. In 304, it may be determined whether the requested change is to be authorized. In 306, an authorization message may be sent to the call managing server, in case it is determined that the requested change is to be authorized.

According to various embodiments, a non-authorizing message may be sent to the call managing server, in case it is determined that the requested change is not to be authorized.

According to various embodiments, the receiving, determining and sending may be performed by an end device.

According to various embodiments, at least one of the request message and the authorization message may be a message in accordance with a call control protocol. The call control protocol may also be referred to as session control protocol or as telecommunication conference control protocol.

According to various embodiments, the call control protocol may include or may be at least one protocol of: Session Initiation Protocol SIP, Real-Time Control Protocol RTCP, Hyper Text Transport Protocol http, File Transfer Protocol FTP, Simple Mail Transfer Protocol SMTP, and XML Configuration Access Protocol XCAP.

According to various embodiments, the change of the collaborative communications session may be related to at least one of the following types of change: change of an existing media of the collaborative communications session; addition of a media to the collaborative communications session; and release of a media from the collaborative communications session.

According to various embodiments, the request message may be a SIP NOTIFY message or a SIP INFO message.

According to various embodiments, the authorization message may be a SIP REFER message or a SIP INFO message.

According to various embodiments, in the request message, a type of a change for which authorization is requested, may be indicated.

According to various embodiments, receiving the request message requesting authorization for the change of the collaborative communications session from the call managing server of the collaborative communications session may be performed by an end device of the collaborative communications session based on a subscription of the end device for notifications about collaborative communications session change requests.

According to various embodiments, receiving the request message requesting for the authorization of the change of the collaborative communications session from the call managing server of the collaborative communications session may be performed by an end device of the collaborative communications session based on a subscription of the end device for a dialog event package.

According to various embodiments, determining whether the requested change is to be authorized may be performed in an end device of the collaborative communications session based on user input into the end device.

According to various embodiments, determining whether the requested change is to be authorized may be performed in an end device of the collaborative communications session based on the evaluation of a pre-determined rule.

According to various embodiments, the pre-determined rule may include or may be a rule relating to the type of the requested change and pre-determined user preferences.

Figure 4:
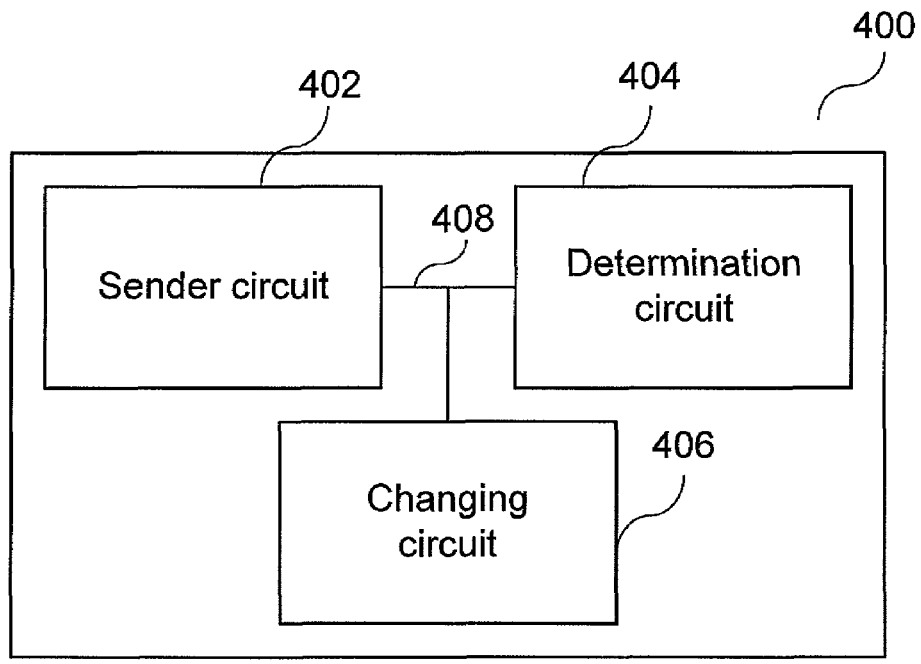
FIG. 4 shows a call managing server in accordance with an embodiment.

FIG. 4 shows a call managing server 400 in accordance with an embodiment. The call managing server 400 may include: a sender circuit 402 configured to send a request message requesting for authorizing a change of a collaborative communications session to an end device of a collaborative communications session; a determination circuit 404 configured to determine whether an authorization message is received from the end device in response to the request message sent; and a changing circuit 406 configured to change the collaborative communications session, in case it is determined that an authorization message is received from the end device in response to the request message sent. The sender circuit 402, the determination circuit 404, and the changing circuit 406 may be coupled with each other, e.g. via an electrical connection 408 such as e.g. a cable or a computer bus or via any other suitable electrical connection to exchange electrical signals.

According to various embodiments, at least one of the request message and the authorization message may be a message in accordance with a call control protocol. The call control protocol may also be referred to as session control protocol or as telecommunication conference control protocol.

According to various embodiments, the call control protocol may include or may be at least one of the following protocols: Session Initiation Protocol SIP, Real-Time Control Protocol RTCP, Hyper Text Transport Protocol http, File Transfer Protocol FTP, Simple Mail Transfer Protocol SMTP, and XML Configuration Access Protocol XCAP.

According to various embodiments, the change of the collaborative communications session may be related to at least one of the following types of change: change of an existing media of the collaborative communications session; addition of a media to the collaborative communications session; and release of a media from the collaborative communications session.

According to various embodiments, the request message may be a SIP NOTIFY message or a SIP INFO message.

According to various embodiments, the authorization message may be a SIP REFER message or a SIP INFO message.

According to various embodiments, the determination circuit 404 may be configured to determine that no authorization message is received from the end device in response to the request message sent in case no authorization message is received from the end device within a pre-determined period of time after the time of sending the request message.

According to various embodiments, the determination circuit 404 may be configured to determine that no authorization message is received from the end device in response to the request message sent in case a non-authorization message is received from the end device in response to the request message sent.

According to various embodiments, in case it is determined that no authorization message is received from the end device in response to the request message sent, the collaborative communications session may not be changed.

According to various embodiments, in the request message, a type of a change for which authorization is requested, may be indicated.

According to various embodiments, the changing circuit 406 may be configured to, in case an authorization message is received from the end device in response to the request message sent, change the collaborative communications session in accordance with the type of change for which authorization is requested.

According to various embodiments, the sender circuit 402 may further be configured to send the request message requesting for authorizing the change of the collaborative communications session to the end device of the collaborative communications session based on a subscription of the end device for notifications about collaborative communications session change requests.

According to various embodiments, the sender circuit 402 may further be configured to send the request message requesting for the authorization of the change of the collaborative communications session to the end device of the collaborative communications session based on a subscription of the end device for a dialog event package.

According to various embodiments, the end device may be a member (in other words: a participator) of the collaborative communications session.

Figure 5:
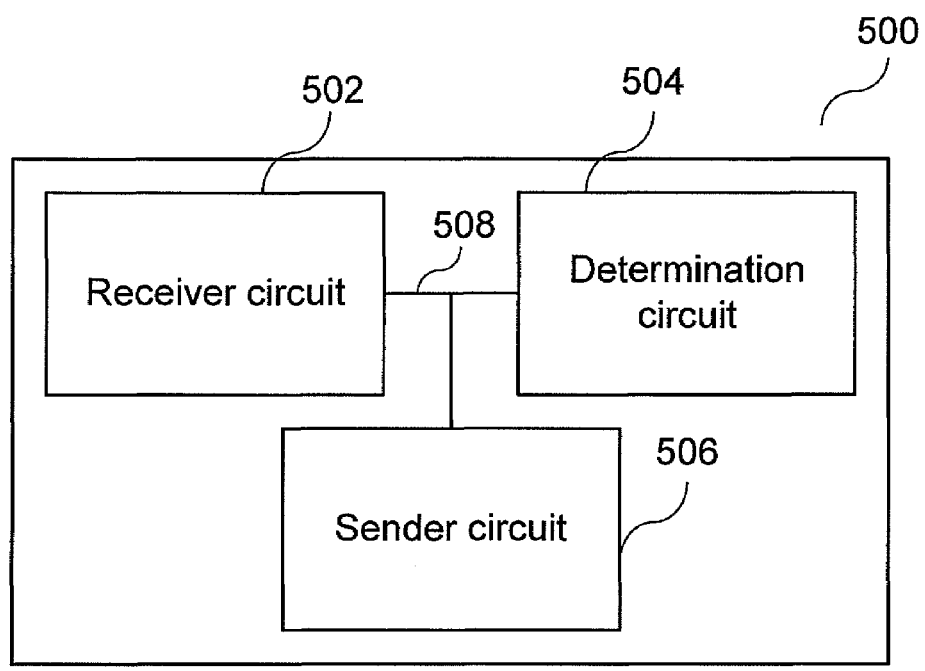
FIG. 5 shows an end device in accordance with an embodiment.

FIG. 5 shows an end device 500 in accordance with an embodiment. The end device 500 may be an end device for authorizing a change of a collaborative communications session. The end device may include a receiver circuit 502 configured to receive a request message requesting for authorizing a change of a collaborative communications session from a call managing server of the collaborative communications session; a determination circuit 504 configured to determine whether the requested change is to be authorized; and a sender circuit 506 configured to sending an authorization message to the call managing server, in case it is determined that the requested change is to be authorized. The receiver circuit 502, the determination circuit 504 and the sender circuit 506 may be coupled with each other, e.g. via an electrical connection 508 such as e.g. a cable or a computer bus or via any other suitable electrical connection to exchange electrical signals.

According to various embodiments, the sender circuit 506 may further be configured to send a non-authorizing message to the call managing server, in case it is determined that the requested change is not to be authorized.

According to various embodiments, at least one of the request message and the authorization message may be a message in accordance with a call control protocol. The call control protocol may also be referred to as session control protocol or as telecommunication conference control protocol.

According to various embodiments, the call control protocol may include or may be at least one of the following protocols: Session Initiation Protocol SIP, Real-Time Control Protocol RTCP, Hyper Text Transport Protocol http, File Transfer Protocol FTP, Simple Mail Transfer Protocol SMTP, and XML Configuration Access Protocol XCAP.

According to various embodiments, the change of the collaborative communications session may be related to at least one of the following types of change: change of an existing media of the collaborative communications session; addition of a media to the collaborative communications session; and release of a media from the collaborative communications session.

According to various embodiments, the request message may be a SIP NOTIFY message or a SIP INFO message.

According to various embodiments, the authorization message may be a SIP REFER message or a SIP INFO message.

According to various embodiments, in the request message, a type of a change for which authorization is requested, may be indicated.

According to various embodiments, the receiver circuit 502 may be configured to receive the request message requesting for authorizing the change of the collaborative communications session from the call managing server of the collaborative communications session based on a subscription of the end device for notifications about collaborative communications session change requests.

According to various embodiments, the receiver circuit 502 may be configured to receive the request message requesting for the authorization of the change of the collaborative communications session from the call managing server of the collaborative communications session based on a subscription of the end device for a dialog event package.

According to various embodiments, the end device 500 may further include a circuit (not shown) configured to determine whether the requested change is to be authorized based on user input into the end device.

According to various embodiments, the end device 500 may further include a circuit (not shown) configured to determine whether the requested change is to be authorized based on the evaluation of a pre-determined rule.

According to various embodiments, the pre-determined rule may include a rule relating to the type of the requested change and pre-determined user preferences.

According to various embodiments, the end device may be a member (in other words: a participator) of the collaborative communications session.

Figure 6:
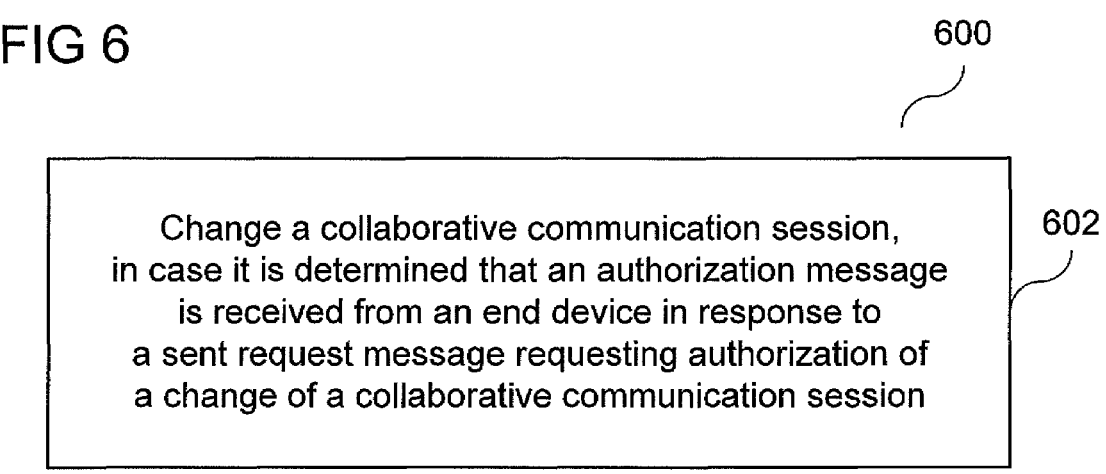
FIG. 6 shows a flow diagram illustrating a method for changing a collaborative communications session in accordance with an embodiment.

FIG. 6 shows a flow diagram 600 illustrating a method for changing a collaborative communications session in accordance with an embodiment. In 602, a collaborative communications session may be changed in case it is determined that an authorization message is received from an end device in response to a sent request message requesting authorizing a change of a collaborative communications session.

In an embodiment, a method for authorizing a change of a collaborative communications session may be provided. The method may include sending an authorization message to a call managing server, in case it is determined that a change of a collaborative communications session requested in a request message from a call managing server of the collaborative communications session is to be authorized.

In an embodiment, a call managing server may be provided. The call managing server may include a changing circuit configured to change a collaborative communications session, in case the call managing server determines that an authorization message is received from the end device in response to a request message requesting authorizing a change of a collaborative communications session sent by the call managing server.

In an embodiment, an end device for authorizing a change of a collaborative communications session may be provided. The end device may include a sender circuit configured to send an authorization message to a call managing server, in case the end device determines that a change of a collaborative communications session requested in a request message from a call managing server of the collaborative communications session is to be authorized.

According to various embodiments, a computer program product may be provided, which may include a program, which, in case it is executed by a computer, may perform one of the methods described above.

According to various embodiments, devices and methods for collaborative communications sessions may be provided. A collaborative session, for example a collaborative communications session, may be a peer's communications session that may include multiple communication devices. In other words the communication peer may be using multiple communication devices to communicate with other peers. One or several of the devices may be controlling the collaborative session. Those controller devices may be able to direct media (e.g. audio, video, text, etc.) to the collaborative session's devices.

According to various embodiments, devices and methods for authorizing media modification, addition or release requests from other devices by controller devices may be provided.

According to various embodiments, in the IP Multimedia Subsystem (IMS) collaborative sessions may be setup and used.

According to various embodiments, in IMS collaborative sessions a single user may register multiple devices for communications. A collaborative session may be established when one of the multiple devices requests to transfer one or several of its media to another device registered by the user. After the transfer, the requesting device may not be receiving the media anymore. Instead the other device may be receiving the media.

According to various embodiments, in IMS collaborative sessions, the transferring device may automatically become the collaborative session's controlling device. IMS collaborative sessions may have only one controlling device. According to various embodiments, multiple controlling devices may be set up and managed within collaborative sessions.

According to various embodiments, IMS collaborative sessions may be based on the Session Initiation Protocol (SIP).

According to various embodiments, SIP REFER messages may be used to request SIP messages to be sent by other devices. In IMS collaborative sessions, SIP REFER messages may be used to transfer media from a given device to another device (which may be understood as changing at least one end device in an existing communication of a pre-determined media between at least two end devices).

According to various embodiments, in SIP messages, media may be described in the message's body according to the Session Description Protocol (SDP).

According to various embodiments, enhancements of IMS collaborative sessions may allow for multiple subscribers within a single collaborative session.

According to various embodiments, enhancements of IMS collaborative sessions may allow for sharing collaborative session control between multiple controller devices.

According to various embodiments, depending on the operator's policy in collaborative sessions with multiple subscribers, media modifications may be required to be authorized by a collaborative session's controller device.

According to various embodiments, authorization may be requested from a controller device for media addition, modification or release for a different device by sending a SIP NOTIFY message to the controller device. According to various embodiments, the SIP NOTIFY message may include relevant media information in its body. According to various embodiments, the controller device may respond its authorization decision with a SIP REFER message.

According to various embodiments, in order to receive the SIP NOTIFY message, the controller device may subscribe to the dialog event package for the other device.

According to various embodiments, instead of using a SIP NOTIFY message for requesting authorization, a SIP INFO message may be used.

According to various embodiments, instead of using a SIP REFER message for responding to the authorization request, a SIP INFO message may be used.

According to various embodiments, media modifications requested by controlled devices may be authorized by a controller device that belongs to a different subscriber.

According to various embodiments, in collaborative sessions with multiple controller devices, actions by one controller may be authorized by the other controller devices of the collaborative session, for example, if the controller devices belong to different subscribers.

FIG. 7 shows a signaling flow diagram 700 illustrating a signaling flow in accordance with an embodiment. For explanation of the signaling flow diagram 700, a system with an architecture like depicted in FIG. 1 may be assumed.

For example, an IMS based communications system may be considered. The system may include or may consist of end devices and servers. The end devices may be connected to the servers. For better readability, all relevant servers may be assumed to be subsumed in a single IMS server entity. However, it will be understood that in real world implementations, the IMS may include or may consist of several servers (like e.g. Call Session Control Function Server, Application Server, etc.). For session control, the Session Initiation Protocol (SIP) may be used.

For example, end device T1 (the first end device 102) may belong to the first user (and subscriber) U1. For example, two end devices T2, (the second end device 104) and T3 (the third end device 106), may belong to the second user (and different subscriber) U2. For example, another end device T4 (the fourth end device 108) may belong to the third user U3. All end devices may be connected to the IMS server 110 and may be registered at the server 110.

For example, the first user U1 may communicate with his device T1 (the first end device 102) with the third user U3 via audio media, like indicated by arrow 704. For example, the first user U1's friend user U2 (the second user) may stand near to user U1 and may follow the conversation. For example, users U1 and U2 may like to communicate with the third user U3 via video also. For example, the first end device T1 of the first user U1 may not support video. But for example the second end device T2 of the second user U2 may support video media. For example, the fourth end device T4 of the third user U3 may also support video. Therefore, for example, the first user U1 may like to add video media to his conversation using the second end device T2 of the second user U2 for the video communication part. For example, the first end device T1 of the first user U1 may send a SIP REFER message (not shown) to the IMS server in order to add video media to the communication using the second end device T2 of the second user U2 for the added video media. According to various embodiments, the server may then send SIP INVITE messages (not shown) to the second end device T2 and to the fourth end device T4 in order to add the video media to the communication.

According to various embodiments, the video media addition may implicitly establish a collaborative session including or consisting of the first end device 102 (T1) and the second end device 104 (T2) of the first user U1 and the second user U2. According to various embodiments, the first end device 102 (T1) may automatically become controller device for the collaborative session, like indicated by box 702, since the collaborative session has been initiated by the first end device 102 (T1). According to various embodiments, the IMS server 110 may inform the first end device 102 (T1) of the first user U1 on the outcome of the media addition request by sending a corresponding SIP NOTIFY message (not shown) to the first end device 102 (T1). According to various embodiments, the SIP NOTIY message may be sent to the first end device 102 (T1) because the first end device 102 (T1) has been implicitly registered for the SIP REFER event package when the IMS server received the SIP REFER message from T1. For example, high resolution video transmission may be provided between the second end device 104 (T2) and the fourth end device 108 (T4), like indicated by arrow 706.

For example, upon receiving the SIP NOTIFY message according to various embodiments, the first end device 102 (T1) of the first user U1 may subscribe to the SIP dialog event package for the SIP session between the second end device 104 (T2) of the second user U2 and the IMS server 110. For example, through the subscription, the first end device 102 (T1) may receive notifications regarding the state of the second end device's (i.e. T2's) SIP session. According to various embodiments, when subscribing to the SIP dialog event package, the first end device 102 (T1) may indicate that it would like to receive SDP information included in event notifications.

For example, later the second user U2 may want to modify the video media in order to use cheaper low resolution video. According to various embodiments, the second end device 104 (T2) may send a corresponding SIP re-INVITE (i.e. a SIP INVITE message) request 708 to the IMS Server 110 (S). According to various embodiments, the SIP INVITE message may include SDP information about the wanted lower video resolution. According to various embodiments, then the IMS server 110 may send a SIP NOTIFY message 710 to the first end device 102 (T1) of the first user U1 to inform about the re-INVITE request received from second end device 104 (T2). According to various embodiments, the SIP NOTIFY message 710 may be sent because the first end device 102 (T1) is subscribed to the SIP dialog event package for the second end device 104 (T2).

According to various embodiments, the SIP NOTIFY message 710 may be as follows:

```
Request-URI                     T1
SIP HEADERS
To:T1
From:                           S
Call-ID:                        a84b4c76e66710
Event:                          invite;id=93809824
Contact:                        S
Content-Length:                 321
Content-Type:                   application/dialog-info+xml
CONTENT
<?xml version="1.0"?>
<dialog-info xmlns="urn:ietf:params:xml:ns:dialog-info"
                    version="0"
                    state="full"
                    entity=S>
    <dialog id="as7d900as8" call-id="a84b4c76e66710"
                    local-tag="1928301774" direction= "initiator">
        <state>trying</state>
        <local>
            <identity>T2</identity>
            <target>T2</target>
            <session-description type="application/sdp">
v=0
o=- 1027933615 1027933615 IN IP4 123.112.67.87
s=-
t=0 0
m=video 1009 RTP/AVP 98 99
c= IN IP4 123.112.67.87
a=rtpmap:98 H263
a=fmtp:98 H263
a=fmtp:98 profile-level-id=0
a=rtpmap:99 MP4V-ES
            </session-description>
        </local>
        <remote>
            <identity>T4</identity>
            <target>T4</target>
            <session-description type="application/sdp">
v=0
o=- 1027933615 1027933615 IN IP4 123.112.67.87
s=-
t=0 0
m=audio 49174 RTP/AVP 96 97
c= IN IP4 132.54.76.98
b=AS:25.4
a=rtpmap:96 AMR
a=fmtp:96mode-set=0,2,5,7; mode-change-period=2
a=rtpmap:97 telephone-event
a=maxptime:20
m=video 1009 RTP/AVP 98 99
c=IN IP4 132.54.76.98
a=rtpmap:98 H263
a=fmtp:98 H263
a=fmtp:98 profile-level-id=0
a=rtpmap:99 MP4V-ES
            </session-description>
        </remote>
    </dialog>
</dialog-info>
```

It is to be noted that in the above SIP NOTIFY message 710 for notifying a controller device about a media modification request within a collaborative session, S may be the SIP address of IMS server 110, T1 may be the SIP address of the first end device 102 (T1), T2 may be the SIP address of the second end device 104 (T2), and T4 may be the SIP address of the fourth end device 108 (T4), and that not all SIP header fields may be shown, but SIP header fields relevant for the embodiment may be shown.

According to various embodiments, upon receiving the SIP NOTIFY message 710, the first end device 102 (T1) may ask the first user U1 to authorize the requested media modification or may refer to a pre-determined rule for determination, whether the requested media modification is to be authorized. For example, the first user U1 may confirm the authorization, like indicated by arrow 712, and his device T1 (the first end device 102) may send a SIP REFER message 714 back to the IMS server 110. According to various embodiments, the SIP REFER message 714 may include SDP information about the change in the collaborative communications session, for example information about the requested lower resolution video. For example, the included SDP may indicate to the IMS server 110 that the first user U1 authorized the media modification request.

According to various embodiments, the SIP REFER message may be as follows:

```
Request-URI         S
SIP HEADERS
To:                 S
From:               T1
Refer-to:           T2;
                    method=INVITE;
                    Call-ID= a84b4c76e66710;
                    Content-Length=33;
                    Content-Type= application/sdp
                    Body="m=video 1009 RTP/AVP 98 99"
Contact:            T1
```

It is to be noted that in the above-shown SIP REFER message 714 for authorizing a media modification request within a collaborative session, S may be the SIP address of IMS server 110, T1 may be the SIP address of the first end device 102 (T1), T2 may be the SIP address of the second end device 104 (T2), and T4 may be the SIP address of the fourth end device 108 (T4), and that not all SIP header fields may be shown, but SIP header fields relevant for the embodiment may be shown.

According to various embodiments, then the IMS server 110 may send a SIP re-INVITE message 716 to the fourth end device 108 (T4) in order to modify the video media. According to various embodiments, the fourth end device 108 (T4) may send a SIP OK message 718 back to the IMS server 110, and the IMS server 110 may send a SIP OK message 720 as a response to the SIP INVITE message 708 to the second end device 104. According to various embodiments, then a low resolution video communication may be established between the second end device 104 (T2) and the fourth end device 108 (T4), like indicated by arrow 722.

According to various embodiments, if the first user U1 would not have authorized the requested media modification, then his first end device 102 (T1) would also have sent a SIP REFER message 714 back to the IMS server 110. But in this case, according to various embodiments, the SIP REFER message 714 would have contained SDP information describing the video media as it is already in use. According to various embodiments, the unaltered SDP information would indicate to the IMS server 110 that the media modification request has not been authorized. Accordingly, according to various embodiments, the IMS server 110 would not send a SIP re-INVITE message to the fourth end device 108 (T4) for media modification and would not respond with a SIP 200 OK message 720 to the SIP re-INVITE request 708 of the second end device 104 (T2).

Figure 8:
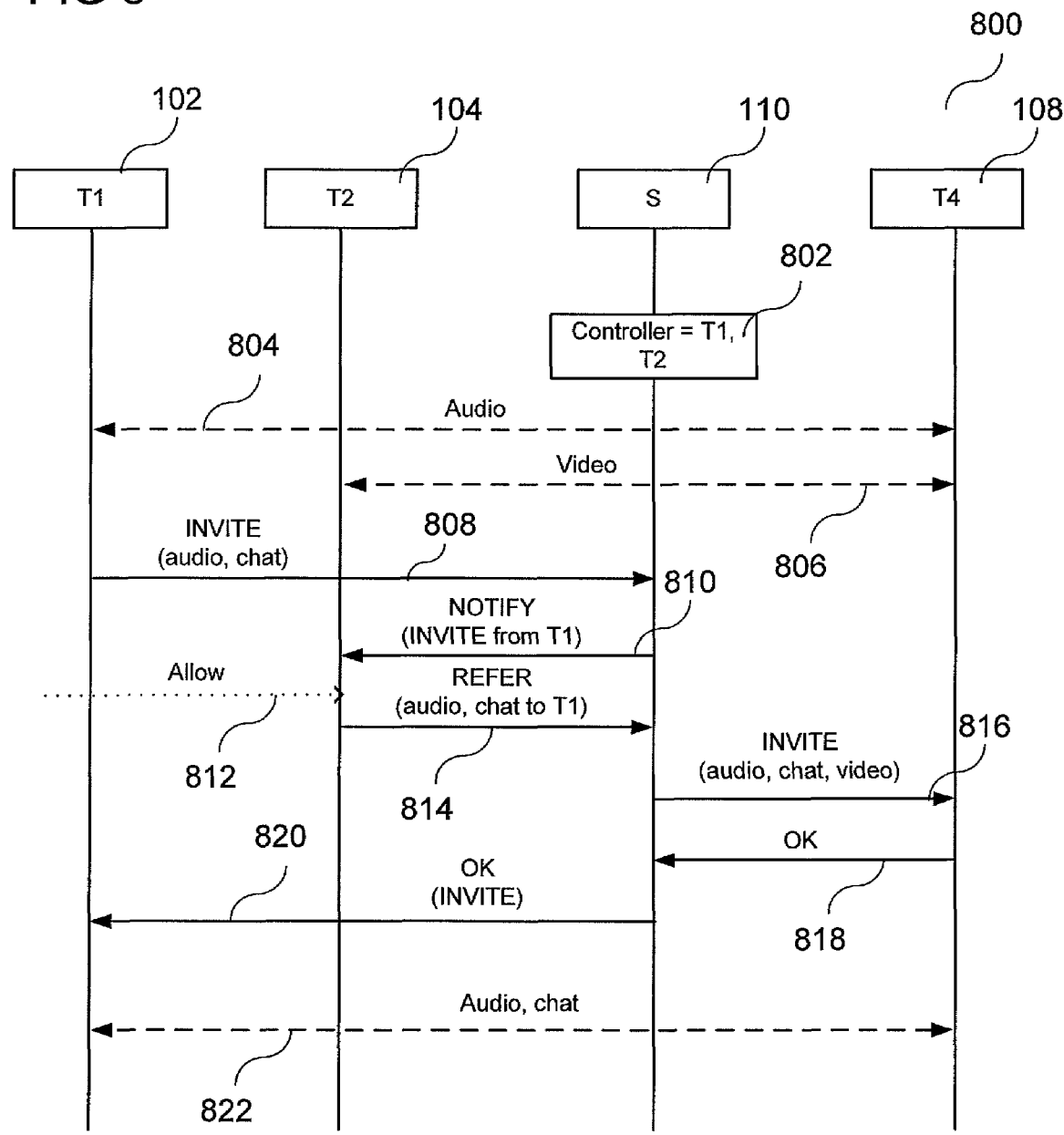
FIG. 8 shows a signaling flow diagram illustrating a signaling flow in accordance with an embodiment.

FIG. 8 shows a signaling flow diagram 800 illustrating a signaling flow in accordance with an embodiment. For explanation of the flow diagram 800, a situation similar to the situation described with reference to FIG. 7 and FIG. 1 may be assumed.

For example, the first user U1 may allow the second end device 104 (T2) to also control the collaborative session (in addition to the first end device 102 (T1)) by sending a corresponding SIP INFO message (not shown) to the IMS server 110. For example, the second end device 104 (T2) may be informed by another SIP INFO message (not shown) that it is also allowed to control the collaborative session. For example, upon receiving the SIP INFO message according to various embodiments, the second end device 104 (T2) may subscribe to the SIP dialog event package for the first end device (T1) of the first user U1 in order to be able to receive information about the media connections within the collaborative session. For example, the first end device 102 (T1) and the second end device 104 (T2) may be controllers of the collaborative session, like indicated by box 802.

For example, audio communication may be provided between the first end device 102 (T1) and the fourth end device 108 (T4), like indicated by arrow 804. Furthermore, for example, video communication may be provided between the second end device 104 (T2) and the fourth end device 108 (T4), like indicated by arrow 806.

For example, the first user U1 may want to add chat media to the communication using his first end device 102 (T1). According to various embodiments, the first end device 102 (T1) may send a corresponding SIP re-INVITE message 808 to the IMS server 110. According to various embodiments, then the IMS server 110 may send a SIP NOTIFY message 810 to the second end device 104 (T2) of the second user U2 to inform about the re-INVITE request 808 received from the first end device 102 (T1). According to various embodiments, the SIP NOTIFY message 810 may be sent because the second end device 104 (T2) is subscribed to the SIP dialog event package for the first end device 102 (T1).

According to various embodiments, the SIP NOTIFY message 810 may be as follows:

```
Request-URI              T2
SIP HEADERS
To:                      T2
From:                    S
Call-ID:                 a84b4c76e66710
Event:                   invite;id=93809824
Contact:                 S
Content-Length:          3212
Content-Type:            application/dialog-info+xml
CONTENT
<?xml version="1.0"?>
<dialog-info xmlns="urn:ietf:params:xml:ns:dialog-info"
                version="0"
                state="full"
                entity=S>
    <dialog id="as7d900as8" call-id="a84b4c76e66710"
            local-tag="1928301774" direction="initiator">
        <state>trying</state>
        <local>
            <identity>T1</identity>
            <target>T1</target>
            <session-description type="application/sdp">
v=0
o=- 1027933615 1027933615 IN IP4 123.112.67.87
s=-
t=0 0
m=audio 49174 RTP/AVP 96 97
c= IN IP4 132.54.76.98
b=AS:25.4
a=rtpmap:96 AMR
a=fmtp:96mode-set=0,2,5,7; mode-change-period=2
a=rtpmap:97 telephone-event
a=maxptime:20
m=message 12763 TCP/MSRP *
a=accept-types:text/plain
            </session-description>
        </local>
        <remote>
            <identity>T4</identity>
            <target>T4</target>
            <session-description type="application/sdp">
v=0
o=- 1027933615 1027933615 IN IP4 123.112.67.87
s=-
t=0 0
m=audio 49174 RTP/AVP 96 97
c= IN IP4 132.54.76.98
b=AS:25.4
a=rtpmap:96 AMR
a=fmtp:96mode-set=0,2,5,7; mode-change-period=2
a=rtpmap:97 telephone-event
a=maxptime:20
m=video 1009 RTP/AVP 98 99
c= IN IP4 132.54.76.98
a=rtpmap:98 H263
a=fmtp:98 H263
a=fmtp:98 profile-level-id=0
a=rtpmap:99 MP4V-ES
m=message 12763 TCP/MSRP *
a=accept-types:text/plain
            </session-description>
        </remote>
    </dialog>
</dialog-info>
```

It is to be noted that in the above-shown SIP NOTIFY message 810 for notifying a controller device about a media addition request within a collaborative session, S may be the SIP address of IMS server 110, T1 may be the SIP address of the first end device 102 (T1), T2 may be the SIP address of the second end device 104 (T2), and T4 may be the SIP address of the fourth end device 108 (T4), and that not all SIP header fields may be shown, but SIP header fields relevant for the embodiment may be shown.

According to various embodiments, upon receiving the SIP NOTIFY message 810, the second end device 104 (T2) may ask the second user U2 to authorize the change of the collaborative session, for example to authorize the requested media addition, or may refer to a pre-determined rule for determining whether to authorize the change of the collaborative session. According to various embodiments, the second user U2 may confirm the authorization, like indicated by arrow 812, and his second end device 104 (T2) may send a SIP REFER message 814 back to the IMS server 110. According to various embodiments, the SIP REFER message 814 may include SDP information about the requested chat media. According to various embodiments, the included SDP may indicate to the IMS server 110 that the second end user 104 (U2) authorized the media addition request.

According to various embodiments, the SIP REFER message 814 may be as follows:

```
Request-URI              S
SIP HEADERS
To:                      S
From:                    T2
Refer-to:                T1;
                         method=INVITE;
                         Call-ID= a84b4c76e66710;
                         Content-Length=74;
                         Content-Type= application/sdp
                         Body="m=audio 49174 RTP/AVP 96 97
                                 m=message 7654 TCP/MSRP *"
Contact:                 T2
```

It is to be noted that in the above-shown SIP REFER message 814 for authorizing a media addition request within a collaborative session, S may be the SIP address of IMS server 110, T1 may be the SIP address of the first end device 102 (T1), T2 may be the SIP address of the second end device 104 (T2), and T4 may be the SIP address of the fourth end device 108 (T4), and that not all SIP header fields may be shown, but SIP header fields relevant for the embodiment may be shown.

According to various embodiments, then the IMS server 110 may send a SIP re-INVITE message 816 to the fourth end device 108 (T4) in order to add the chat media. The fourth end device 108 (T4) may send a SIP OK message back to the IMS server 110, and the IMS server 110 may send a SIP OK message 820 as a response to the SIP INVITE message 808 to the first end device 102 (T2). According to various embodiments, then an audio and chat communication may be provided between the first end device 102 (T1) and the fourth end device 108 (T4), like indicated by arrow 822.

According to various embodiments, instead of explicitly subscribing to the SIP dialog event package, controller devices may automatically (for example implicitly) be subscribed to the SIP dialog event package for controlled devices when the controller devices become controller devices.

According to various embodiments, instead of using a SIP NOTIFY message for requesting authorization, a SIP INFO message may be used.

According to various embodiments, instead of using a SIP REFER message for responding to the authorization request, a SIP INFO message may be used.

According to various embodiments, instead of using the various devices and methods in collaborative sessions with multiple subscribers, various embodiments may also be used in collaborative sessions including or consisting of the devices of a single subscriber.

According to various embodiments, devices and methods may be used for collaborative sessions consisting of more than two devices.

According to various embodiments, devices and methods may be used in communications systems that are not based on the IMS.

According to various embodiments, instead of subscribing to the SIP dialog event package, controller devices might subscribe to other relevant event packages. According to various embodiments, controller devices may subscribe to the REFER event package for other devices using SIP REFER to transfer media.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for changing a collaborative communications session, the method comprising:
   receiving, by an IP multimedia subsystem (IMS) server, a Session Initiation Protocol (SIP) INVITE message from a first device to request a change of a media portion of a collaborative communications session;
   sending, by the IMS server based on the received SIP INVITE message, a SIP NOTIFY or SIP INFO message requesting authorization for the change of the media portion of the collaborative communications session to an end device of the collaborative communications session, wherein the media portion is between the first device and a second device, which is not the end device, and at least another portion of the collaborative communications session is between the end device and the first device or the second device;
   determining whether a SIP REFER or SIP INFO message authorizing the change is received from the end device in response to the SIP NOTIFY or SIP INFO message sent; and
   changing the media portion of the collaborative communications session, in case it is determined that a SIP REFER or SIP INFO message authorizing the change is received from the end device in response to the SIP NOTIFY or SIP INFO message sent.

2. The method of claim 1, wherein sending the SIP NOTIFY or SIP INFO message requesting authorization for the change of the media portion of the collaborative communications session to the end device of the collaborative communications session is performed based on a subscription of the end device for notifications about collaborative communications session change requests.

3. A method for authorizing a change of a collaborative communications session, the method comprising:
   receiving, by a controller device, a Session Initiation Protocol (SIP) NOTIFY or SIP INFO message requesting authorization for a change of a media portion of a collaborative communications session from an IP multimedia subsystem (IMS) server of the collaborative communications session, wherein the media portion is between two devices that do not include the controller device and at least another portion of the collaborative communications session between the controller device and at least one of the two devices;
   determining whether the requested change is to be authorized; and
   sending SIP REFER or SIP INFO message to the IMS server, in case it is determined that the requested change is to be authorized.

4. The method of claim 3, wherein receiving the SIP NOTIFY or SIP INFO message requesting authorization for the change of the collaborative communications session from the IMS server of the collaborative communications session is based on a subscription of the controller device for notifications about collaborative communications session change requests.

5. An IP multimedia subsystem (IMS) server comprising:
   a sender circuit configured to send a Session Initiation Protocol (SIP) NOTIFY or SIP INFO message requesting authorization for a change of a media portion of a collaborative communications session to an end device of a collaborative communications session, wherein the media portion is between two devices that do not include the end device and at least another portion of the collaborative communications session is between the end device and at least one of the two devices;
   a determination circuit configured to determine whether a SIP REFER or SIP INFO message authorizing the change is received from the end device in response to the SIP NOTIFY or SIP INFO message sent; and
   a changing circuit configured to change the media portion of the collaborative communications session, in case it is determined that a SIP REFER or SIP INFO message authorizing the change is received from the end device in response to the SIP NOTIFY or SIP INFO message sent,
   wherein the end device is configured to be a controller device of the collaborative communication session.

6. The call managing server of claim 5, wherein the sender circuit is further configured to send the SIP NOTIFY or SIP INFO message requesting authorization for the change of the media portion of the collaborative communications session to the end device of the collaborative communications session based on a subscription of the end device for notifications about collaborative communications session change requests.

7. An end device for authorizing a change of a media portion of a collaborative communications session, the end device comprising:
   a receiver circuit configured to receive a Session Initiation Protocol (SIP) NOTIFY or SIP INFO message requesting authorization for a change of a media portion of a collaborative communications session from a IP multimedia subsystem (IMS) server of the collaborative communications session, wherein the media portion is between two devices that do not include the end device and at least another portion of the collaborative communications session is between the end device and at least one of the two devices;
   a determination circuit configured to determine whether the requested change is to be authorized; and
   a sender circuit configured to send a SIP REFER or SIP INFO message to the call managing server, in case it is determined that the requested change is to be authorized;
   wherein the end device is configured to be a controller device of the collaborative communication session.

8. The end device of claim 7, wherein the receiver circuit is configured to receive the SIP NOTIFY or SIP INFO message requesting authorization for the change of the collaborative communications session from the IMS server of the collaborative communications session based on a subscription of the end device for notifications about collaborative communications session change requests.

* * * * *